United States Patent [19]
Kirn

[11] Patent Number: 5,251,406
[45] Date of Patent: Oct. 12, 1993

[54] POWER HAND TOOL WITH A GEARBOX CASING WITH SEALING WASHER

[75] Inventor: Manfred Kirn, Stuttgart, Fed. Rep. of Germany

[73] Assignee: Robert Bosch GmbH, Stuttgart, Fed. Rep. of Germany

[21] Appl. No.: 768,885

[22] PCT Filed: May 17, 1990

[86] PCT No.: PCT/DE90/00369
§ 371 Date: Oct. 18, 1991
§ 102(e) Date: Oct. 18, 1991

[30] Foreign Application Priority Data

May 20, 1989 [DE] Fed. Rep. of Germany ....... 3916495

[51] Int. Cl.⁵ .................... B24B 23/00; F16C 33/74
[52] U.S. Cl. .................... 51/170 R; 277/134
[58] Field of Search .......... 51/170 R, 170 T, 170 PT; 277/68, 134

[56] References Cited

U.S. PATENT DOCUMENTS

| 1,771,440 | 7/1930 | Jeffries | 277/134 |
| 2,088,330 | 7/1937 | Madsen | 51/170 T |
| 2,101,305 | 12/1937 | Albertson | 51/170 T |

FOREIGN PATENT DOCUMENTS

| 2123099 | 1/1984 | United Kingdom . |
| 0261374 | 3/1988 | European Pat. Off. . |
| 2938484 | 3/1981 | Fed. Rep. of Germany . |

*Primary Examiner*—Roscoe V. Parker
*Attorney, Agent, or Firm*—Michael J. Striker

[57] ABSTRACT

A power hand tool has a gear box casing having an opening, at least one high speed shaft extending through the opening, sealing member for sealing the gear box casing against lubricant leakage. The sealing member includes a sealing washer which does not rotate and sits tightly on the shaft and which radially touches a circumference of the opening. The sealing washer is composed of an elastic material which can absorb and release lubricant.

14 Claims, 2 Drawing Sheets

POWER HAND TOOL WITH A GEARBOX CASING WITH SEALING WASHER

BACKGROUND OF THE INVENTION

The invention relates to a power hand tool of the type employing sealing washers at the output and drive shafts.

An electric tool of this type is well known from GM 79 31 401. Its gearbox casing walls are equipped with openings which are penetrated by output and drive shafts, and which are sealed against lubricant leakage by means of axial seals.

In comparison with solutions employed up to now, the use of these axial seals achieves better sealing results, but also leads to a considerable increase in the cost of the machine. The cause of this is that it is expensive to produce the necessary low surface roughness of the counter slide way of the axial seals, and their higher cost in comparison with the sealing washers used before.

SUMMARY OF THE INVENTION

The object of the invention is to provide a power hand tool in contrast to the conventional power hand tools, that can be more effectively sealed without change or with very little change to expenditure on manufacture and the costs of the individual parts, using, for example, felt sealing washers which have been normally used up to now. The seal has a longer life than the well known axial seals. By this means, lubricants with a lower viscosity than those usable up to this time can be used for the power hand tool of this invention.

This increases the life of the gears and the motors. Moreover, the requirement for driving energy is lower. The efficiency of power hand tools in accordance with this invention, extremely important for battery-powered models, increases markedly. Additional features of the invention include the sealing washer being bonded with the hub, or the hub which consists of liquefiable synthetics being diffused into this sealing washer, starting at the inner circumference of the ring-shaped sealing washer. The advantage of it is that forces applied to the sealing surfaces of the sealing washer can neither push the hub and sealing washer against one another nor separate them from one another. Also the press fit of the hub, and thus the sealing washer, on the shaft is very secure.

The present invention both as to its construction and to its mode of operation, together with additional objects and advantages thereof, will be best understood from the following detailed description of preferred embodiments when read with reference to the accompanying drawings.

DETAILED DESCRIPTION OF THE DRAWINGS

Figure 1:
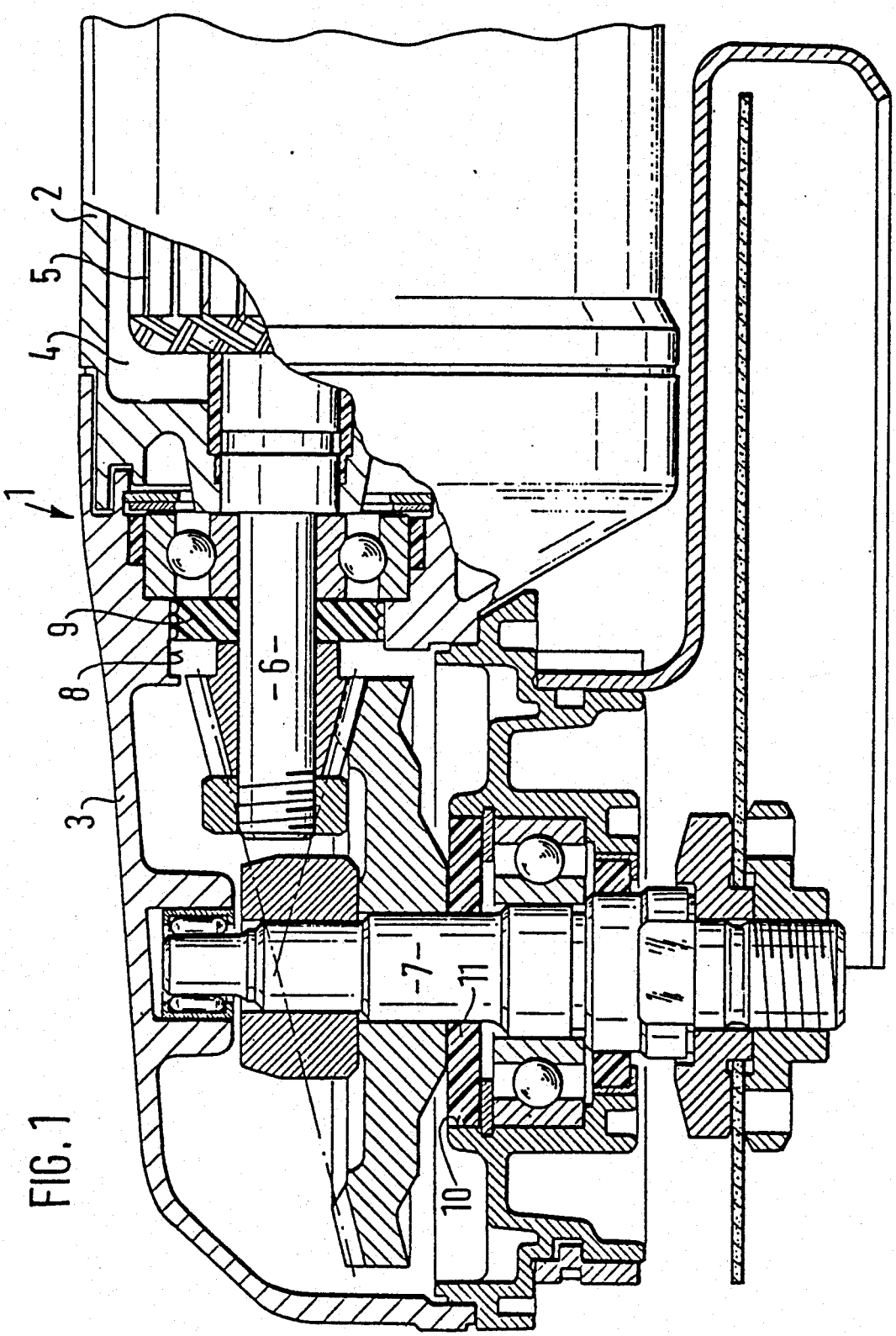
FIG. 1 shows a partial cross-section of a power hand tool having a sealing washer constructed in accordance with a first embodiment of the invention.

The power hand tool 1 shown in FIG. 1 shows a gearbox casing 3 mounted on a motor casing 2. The motor casing 2 encloses a motor compartment 4. In this, an electric motor with a rotor 5, not described in further detail here, is fitted. Its shaft 6 drives, for example, via an angular gear not described in further detail here, a second shaft 7 serving as a tool spindle. One end of the shaft 6 projects through a first shaft opening 8 into the gearbox casing 3.

The first shaft opening 8 is closed by a sealing washer 9 which sits on the shaft 6 and turns with it. An unwanted leakage of lubricant from the gearbox casing 3 into the motor compartment 4 is thus prevented.

For the second shaft 7, there is a second shaft opening 10 on the gearbox casing, on the gear side, which leads outside. This is sealed by means of a second, ring-shaped sealing washer 11, so that the penetration of lubricant along the second shaft 7 to the outside is prevented.

Figure 2:
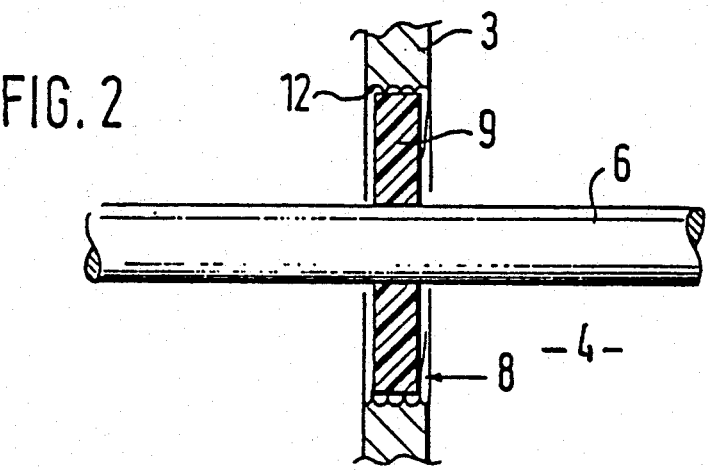
FIG. 2 shoes a cross-section of the sealing washer in FIG. 1.

The detail from FIG. 1 represented in FIG. 2 shows the sealing washer 9 between the gearbox casing 3 and motor compartment 4 sitting hub-like, in the form of a punched disk, directly on the shaft 6. The circumference of the sealing washer 9 touches the circumference of the first shaft opening 8, which is put in the gearbox casing 3 in the form of a cylindrical drilled hole. This shaft opening 8 is equipped with a recirculating helical groove 12 which, like the direction of rotation of the shaft 6, runs rising into the interior of the gearbox casing 3.

When the power hand tool 1 is operated, the lubricant filling the gearbox casing 3 will collect at the first shaft opening 8 or the second shaft opening 10, depending on its position. Due to the sealing washer 9 which rotates together with the shaft 6, the lubricant is constantly spun outwards in a radial direction. As a result of the pump action between sealing washer 9 and the corresponding recirculating helical groove 12, the lubricant is transported into the interior of the gearbox casing 3.

For the power hand tool 1, both static and dynamic sealing of the first and second shaft openings 8 and 10 is ensured. When the motor is idle, the contact pressure of the sealing washers 9 and 11 on the circumferences of the first and second shaft openings 8 and 10 is sufficient to ensure that lubricant leakage is prevented.

Figure 3:
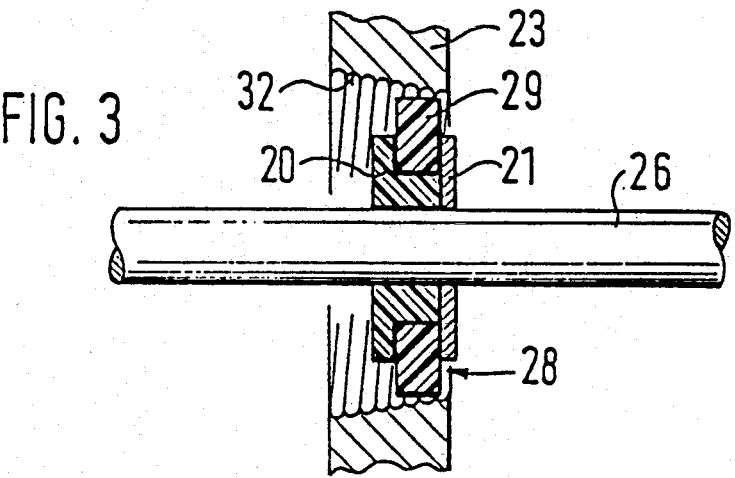
FIG. 3 shows a cross-section of a second embodiment of the sealing washer according to the invention.

The second embodiment shown in FIG. 3 shows a sealing washer 29 which sits on a hub 20 and which is secured axially by means of a thrust ring 21. The hub 20 sits, rotation-resistant, on the shaft 26. The thrust ring 21 which is pressed axially against the sealing washer 29 simultaneously ensures that this does not rotate with the hub 20 or the shaft 6. The sealing washer 29 lies radially adjacent to the edge of the shaft exit 28 of the gearbox casing, and simultaneously touches the threads of the recirculating helical groove 32. For axial security, there can also be an adhesive connection between the sealing washer 29 and the hub 20.

Figure 4:
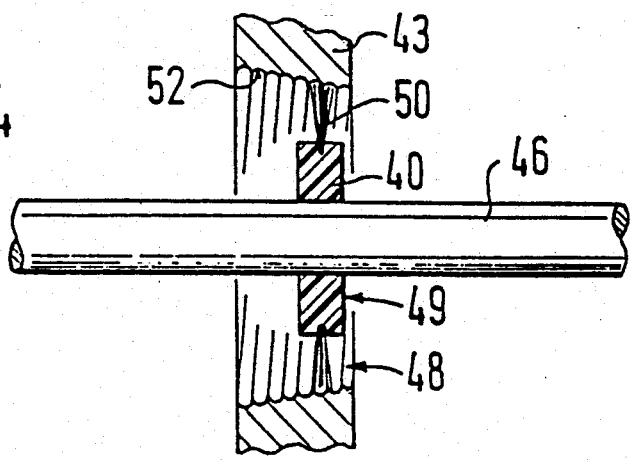
FIG. 4 shows a cross-section of a third embodiment of the sealing washer according to the invention

The third embodiment in accordance with FIG. 4 shows a sealing washer 49 in the form of a ring-shaped brush, with bristles 50 standing radially free outwards. These bristles sit on a ring-shaped hub 40, and the hub is secured against rotation and sits tight on a shaft 46. With their radial, outer area, the bristles 50 touch the edge of a conical shaft opening 48, in which a recirculating helical groove 52 is inserted. When the shaft 46 rotates, the bristles 50 run in the recirculating helical groove 52, and constantly transport the lubricant away from the shaft opening 48 and back into the interior of the gearbox casing 43.

In the case of one design example of the invention not shown here, the hub of the sealing washer is a synthetic ring, e.g. of polyamide. It is sprayed in liquid form onto the inner surface of the sealing washer which consists of felt or textile or similarly porous material, in the area of the intended seating, and is ready-shaped by diffusing into it.

Felt sealing washers with external seating, which normally sit, non-rotating, in a drilled hole and through which a shaft is led, can also be manufactured by the method described above with a synthetic outer ring.

For all the embodiments, there is a further, favorable variant if screw thread-like grooves are worked into the surface areas of the sealing washers 9, 11, 29 and 49, and if necessary one does without recirculating helical grooves 12, 32 and 52 in the shaft openings 8, 10, 28 and 48, i.e. if these are smooth, cylindrical or conical drilled holes.

In addition the aforementioned sealing washers 9, 11 and 29 can have a lubricant-proof impregnation on the side facing away from the lubricant.

While the invention has been illustrated and described as embodied in a power hand tool with a gearbox casing with sealing washer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to beprotected by Letters Patent is set forth in the appended claims.

1. A power hand tool, comprising a gear box casing having an opening; at least one high speed shaft extending through said opening; sealing means for sealing said gear box casing against lubricant leakage, said sealing means including a sealing washer which sits tightly and non-rotatably on said shaft and which radially touches a circumference of said opening, said sealing washer being composed of a material which can absorb and release lubricant.

2. The power hand tool as defined in claim 1, wherein said sealing washer is tire-like.

3. A power hand tool, comprising a gear box casing having an opening; at least one high speed shaft extending through said opening; sealing means for sealing said gear box casing against lubricant leakage, said sealing means including a sealing washer which sits tightly and non-rotatably on said shaft and which radially touches a circumference of said opening, said sealing washer being composed of a material which can absorb and release lubricant, said sealing washer being formed as ring-shaped brush.

4. A power hand tool, comprising a gear box casing having an opening; at least one high speed shaft extending through said opening; sealing means for sealing said gear box casing against lubricating leakage, said sealing means including a sealing washer which sits tightly and non-rotatably on said shaft and which radially touches a circumference of said opening, said sealing washer being composed of a material which can absorb and release lubricant, said sealing washer having one side facing away from said gear box casing and being impermeable on said one side, said sealing washer having another side which is opposite to said one side and being permeable on said another side.

5. A power hand tool, comprising a gear box casing having an opening; at least one high speed shaft extending through said opening; sealing means for sealing said gear box casing against lubricant leakage, said sealing means including a sealing washer which sits tightly and non-rotatably on said shaft and which radially touches a circumference of said opening, said sealing washer being composed of a material which can absorb and release lubricant; and a hub which sits tightly on said shaft, said sealing washer fitting tightly on said hub.

6. A power hand tool, comprising a gear box casing having an opening; at least one high speed shaft extending through said opening; sealing means for sealing said gear box casing against lubricant leakage, said sealing means including a sealing washer which sits tightly and non-rotatably on said shaft and which radially touches a circumference of said opening, said sealing washer being composed of a material which can absorb and release lubricant; a hub and sits tightly and non-rotatably on said shaft, said sealing washer being fixed axially on said hub and secured against rotation; and a retaining disc by means of which said sealing washer sits axially on said hub.

7. A power hand tool, comprising a gear box casing having an opening; at least one high speed shafts extending through said opening; sealing means for sealing said gear box casing against lubricant leakage, said sealing means including a sealing washer which sits tightly and non-rotatably on said shaft and which radially touches a circumference of said opening, said sealing washer being composed of a material which can absorb and release lubricant, said opening being provided with screw thread-like recirculating helical grooves which lead into an interior of said gear box casing.

8. The power hand tool as defined in claim 7, wherein said recirculating helical grooves are provided in an area in which said sealing washer is in contact with said opening.

9. A power hand tool, comprising a gear box casing having an opening; at least one high speed shaft extending through said opening; sealing means for sealing said gear box casing against lubricant leakage, said sealing means including a sealing washer which sits tightly and non-rotatably on said shaft and which radially touche a circumference of said opening, said sealing washer being composed of a material which can absorb and release lubricant, said sealing washer having an outer radial circumferential area and being provided with helical grooves on said outer radial circumferential area.

10. A power hand tool, comprising a gear box casing having an opening; at least one high speed shaft extending through said opening; sealing means for sealing said gear box casing against lubricant leakage, said sealing means including a sealing washer which sits tightly and non-rotatably on said shaft and which radially touches a circumference of said opening, said sealing washer being composed of a material which can absorb and release lubricant; and a hub which is fitted on said shaft, said sealing washer is bonded with said hub.

11. A power hand tool, comprising a gear box casing having an opening; at least one high speed shaft extending through said opening; sealing means for sealing said gear box casing against lubricant leakage, said sealing means including a sealing washer which sits tightly and non-rotatably on said shaft and which radially touches a circumference of said opening, said sealing washer being composed of a material which can absorb and release lubricant; and a hub fitted on said shaft, said hub being composed of liquefiable synthetic material which is diffused into said sealing washer starting at an inner circumference of said sealing washer.

12. A power hand tool, comprising a gear box casing having an opening; at least one high speed shaft extending through said opening; sealing means for sealing said gear box casing against lubricant leakage, said sealing means including a sealing washer which sits tightly and non-rotatably on said shaft and which radially touches a circumference on said opening, said sealing washer being composed of a material which can absorb and release lubricant, said sealing washer having an inner circumference which is sprayed with a synthetic material.

13. A power hand tool, comprising a gear box casing having an opening; at least one high speed shaft extending through said opening; sealing means for sealing said gear box casing against lubricant leakage, said sealing means including a sealing washer which sits tightly and non-rotatably on said shaft and which radially touches a circumference of said opening, said sealing washer being composed of a material which can absorb and release lubricant, said sealing washer having a radial inner surface which is coated with a liquefiable, self-hardening synthetic material.

14. A power hand tool, comprising a gear box casing having an opening; at least one high speed shaft extending through said opening sealing means for sealing said gear box casing against low viscosity lubricant leakage, said sealing means including a sealing washer which sits tightly and non-rotatably on said shaft and which radially touches a circumference of said opening, said sealing washer being composed of a porous material which can absorb and release a low viscosity lubricant, said washer having an inner circumference with a region in which a liquefiable, consolidated plastic is concentrated so that a hub is formed as a non-detachable part of said washer, said opening being provided with a return helical grooves directed into an interior of said gear box housing.

* * * * *